United States Patent [19]

Davis et al.

[11] 4,196,544
[45] Apr. 8, 1980

[54] APPARATUS AND METHOD FOR CONTROLLING PLANT GROWTH WITH ARTIFICIAL LIGHT

[75] Inventors: Noel Davis, Wayzata, Minn.; Noel B. Davis, Alexandria, Va.; William M. Dreier, Minneapolis, Minn.

[73] Assignee: General Mills, Inc., Minneapolis, Minn.

[21] Appl. No.: 894,467

[22] Filed: Apr. 10, 1978

[51] Int. Cl.² ............................................. A01G 9/00
[52] U.S. Cl. ........................................ 47/17; 362/294; 165/47; 47/DIG. 6
[58] Field of Search ........................ 362/294, 336–337, 362/404, 406, 408–409; 47/17, 59, 62, 65, DIG. 6

[56] References Cited

U.S. PATENT DOCUMENTS

| 3,124,903 | 3/1964 | Truhan | 47/17 |
| 3,192,736 | 7/1965 | Werden | 47/17 X |
| 3,348,037 | 10/1967 | Taltavull | 362/294 X |
| 3,372,740 | 3/1968 | Kastovich et al. | 47/17 X |
| 3,498,368 | 3/1970 | Conangle | 47/17 X |
| 3,624,380 | 11/1971 | Davis | 47/17 X |

FOREIGN PATENT DOCUMENTS

| 1121876 | 1/1962 | Fed. Rep. of Germany | 47/17 |
| 2304278 | 10/1976 | France | 47/17 |
| 483086 | 12/1975 | U.S.S.R. | 47/17 |
| 495056 | 2/1976 | U.S.S.R. | 47/DIG. 6 |

Primary Examiner—Robert E. Bagwill
Attorney, Agent, or Firm—L. MeRoy Lillehaugen

[57] ABSTRACT

In a chamber for cultivating plant growth, a plurality of light fixtures are employed, each containing a high intensity discharge lamp. The bulb of the lamp serves as an inner transparent wall and a globe functions as an outer transparent wall. In the space between the bulb and globe water is caused to flow in order to remove unwanted radiation and heat generated by each lamp before the radiation is transmitted into the growth chamber.

17 Claims, 6 Drawing Figures

APPARATUS AND METHOD FOR CONTROLLING PLANT GROWTH WITH ARTIFICIAL LIGHT

BACKGROUND OF THE INVENTION

1. Field of the Invention

This invention relates generally to the cultivation of plants under artificial light, and pertains more particularly to a commercially feasible method and apparatus for efficiently and effectively extracting a substantial proportion of the unwanted radiation and heat generated by the lamps providing the artificial light before it is transmitted into the growth chamber containing the plants.

2. Description of the Prior Art

In growing plants under artificial light, whether the culture be with soil or without soil, various factors must be favorable in order to encourage plant growth. Obviously, the supply of nutrients can be fairly accurately controlled, particularly where the culture is soilless, that is, where the plants are grown hydroponically. Light conditions, of course, must be favorable. While cultivating plants under artificial light can achieve a better control of the light to which the plants are subjected, nonetheless the artifical light can adversely affect the temperature of the plants, thereby interfering with their proper growth.

Hence, light and temperature are interrelated, for if the amount of artificial light is increased appreciably in a growth chamber, then the temperature of the chamber will increase accordingly due to the greater heat from the lamps. By the same token, if the light is decreased, then the resulting temperature is lowered, but there is, quite obviously, less light made available for growing the plants with a concomitant retardation of plant growth.

Too high a temperature is injurious to most plants, resulting in morphological disorders and/or reduced growing rates, so when too much heat is generated by the lamps supplying the artifical light, it becomes necessary to air condition the air in order to lower the temperature. The dehumidification resulting from the air conditioning even further reduces the growth performance of many plants. Furthermore, air conditioning is quite costly.

Consequently, a delicate balancing of the proper amount of moisture, light, air and nutrients becomes quite critical. In a hydroponic installation, other than the nutrient factor, these variables are not susceptible to precise individual control, for changing one affects the others.

An excellent approach to the problem is evidenced in U.S. Pat. No. 3,869,605 granted to Noel Davis on Mar. 4, 1975 for "Environmental Growth Control Apparatus." This patent takes into account that substantially all lamps having a high light output in the optimum wavelength range of from 400 to 700 nanometers generate substantial quantities of heat not only in the alluded to range but in other ranges as well, particularly in the infrared portion of the spectrum. The patent points out that heat emanating from any portion of the light falling outside the 400–700 range tends to merely raise the temperature within the growth chamber, producing additional loads on the temperature control equipment.

Accordingly, the referred to patented apparatus makes use of a light fixture employing a passage above the lamp through which water is circulated in an attempt to control the temperature and/or humidity within the growth chamber. An effort is made to realize as much light as possible from the lamps, the lower side of the passage, which is just above the lamps, having a procelainized surface so as to reflect at least some of the light downwardly. What heat that passes upwardly into the passage from the lamps in the fixture is removed by reason of the water that is caused to flow through the passage. The downwardly directed light, along with the heat associated therewith, is transmitted into the growing chamber. The heated water, through the agency of a remotely located heat exchanger, is employed to vaporize an absorption refrigerant, which may be an ammonia or lithium solution of the absorption unit, the vaporized refrigerant being used to chill a cooling fluid which is then supplied to heat exchange coils within the growth chamber.

While the light fixture disclosed in the aforesaid patent is a decided improvement over what was available prior thereto, a considerable amount of the energy is, nonetheless, conducted into the growing chamber, so there remains a substantial radiation load that must be removed via air conditioning. The more air conditioning resorted to, the greater the dehumidification, resulting in a condition adversely affecting plant growth.

SUMMARY OF THE INVENTION

An important object of our invention is to provide a method and apparatus for more accurately controlling the temperature and humidity in the promotion of plant growth under artificial lighting.

Another object is to remove a substantial proportion of unwanted radiation, particularly in the infrared portion of the spectrum, so that it does not enter the growing chamber and thus does not reach the plants.

Another object of the invention is to provide a method and apparatus that make a more efficient utilization and conservation of energy than heretofore. In this regard, an aim of the invention is to remove a substantial portion of the heat generated by the lamps furnishing the artificial light before the heat can be radiated into the growing chamber.

A further object of the invention is to extract a substantial portion of the heat and unwanted radiation generated by high intensity discharge lamps supplying artificial light to a growing chamber, doing so in a way that the removed heat can be easily utilized for beneficial purposes.

Another object is to derive more light per lamp from the various lamps providing the artificial light. Thus, an aim of the invention is to obtain more light for the same size bulb than heretofore.

An object closely associated with the preceding object is to prolong the life of a conventional lamp. In this regard, for a given wattage supplied to the lamp, the lamp runs cooler than heretofore without reaching temperature levels that accelerate the lamp's breakdown. When following the teachings of the present invention, the lamp can even be driven with a special ballast at wattages in excess of that for which it is rated with an improved lamp life expectancy over that which would be expected if the lamp were used in a conventional or normal way.

The invention has also as an object either minimizing or eliminating the need for costly reflectors. In this regard, it is planned that a considerable amount of the light to be reflected downwardly onto the plants, utilizing the water and outer globe as reflective media or elements. It is also contemplated that the globe have a prismatic surface so as to refract even more of the light downwardly onto the plants below.

Still further, an object is to provide a light fixture that will be relatively inexpensive to manufacture and to maintain.

Yet another object of the invention is to enhance the shape of the plants. Stated somewhat differently, the present invention is concerned with improving the morphology of the plants being grown, and the prevention or substantial amounts of unwanted infrared (700 nanometers and longer wave-lengths) radiation, as well as heat, from striking the plants, especially certain varieties, so that the form and structure of the plants will be enhanced.

Another object of the invention is to not only produce plants having a better shape but also to increase their growth rate, the more rapid maturation of the plants enabling more to be grown per year for a given capital investment.

Also, the invention has for an object the reducing of the physical dimensions of a growth chamber, particularly its height, by reason of being able to locate the lamps closer to the plants therebeneath.

Also, an object is to maintain a desired temperature and/or humidity in a growth chamber, yet also easily change the temperature or humidity for different varieties of plants or change the temperature as a particular plant matures.

A specific object of our invention is to enable the amount of light to be increased in a growth chamber without significantly increasing the temperature of the air within the chamber.

Still further, an object of the invention is to minimize leaf stress by maintaining the proper humidity within the growth chamber, yet not have the humidity so high that it encourages the spread of plant diseases.

Briefly, the invention contemplates a growth chamber employing artificial lighting utilizing a number of light units or fixtures, each fixture making use of an inner transparent bulb and an outer transparent globe. The globe forms a jacket providing a void or space with respect to the bulb so that water can be circulated through the space in order to remove a substantial amount of the heat and unwanted radiation generated by the lamps. It will be recognized that high intensity discharge lamps frequently operate with a bulb temperature of 500° F.

When the ambient air is of a relatively low temperature with respect to the temperature of the air within the growth chamber, the waste heat in the water can be employed to raise the temperature of the incoming fresh air that is replacing air withdrawn from the growth chamber to whatever temperature is necessary to maintain a desired air temperature within the growth chamber. When the waste heat is inadequate to impart the requisite increase in heat to the replacement air, additional heat can be supplied from a separate heating source. By the same token, when air conditioning is needed, that is, a lowering of the chamber's air temperature is required, then a cooling of the replacement air can be effected. Inasmuch as the heat from the lamps is removed before it is radiated into the growing chamber, any air conditioning load is substantially reduced. When all of the waste heat contained in the water is not needed to maintain a desired air temperature within the growth chamber, any surplus can be used for heating another building, or if preferred, it can be discarded.

Owing to the fact that the globe, as far as the present invention is concerned, encompasses the inner bulb, virtually all of the generated light passes through the bulb, water and globe onto the plants. Hence a high percentage of the generated light is actually used. It is also intended that the water and the globe produce a refractive effect, bending a substantial porportion of the light rays passing therethrough downwardly and directly onto the plants beneath. If desired, a prismatic surface can be imparted to the globe thereby further increasing the refraction downwardly. Because of the increased light efficiency, reflectors, which are never perfectly reflective, are either not employed or their use greatly minimized.

DESCRIPTION OF THE PREFERRED EMBODIMENT

Figure 1:
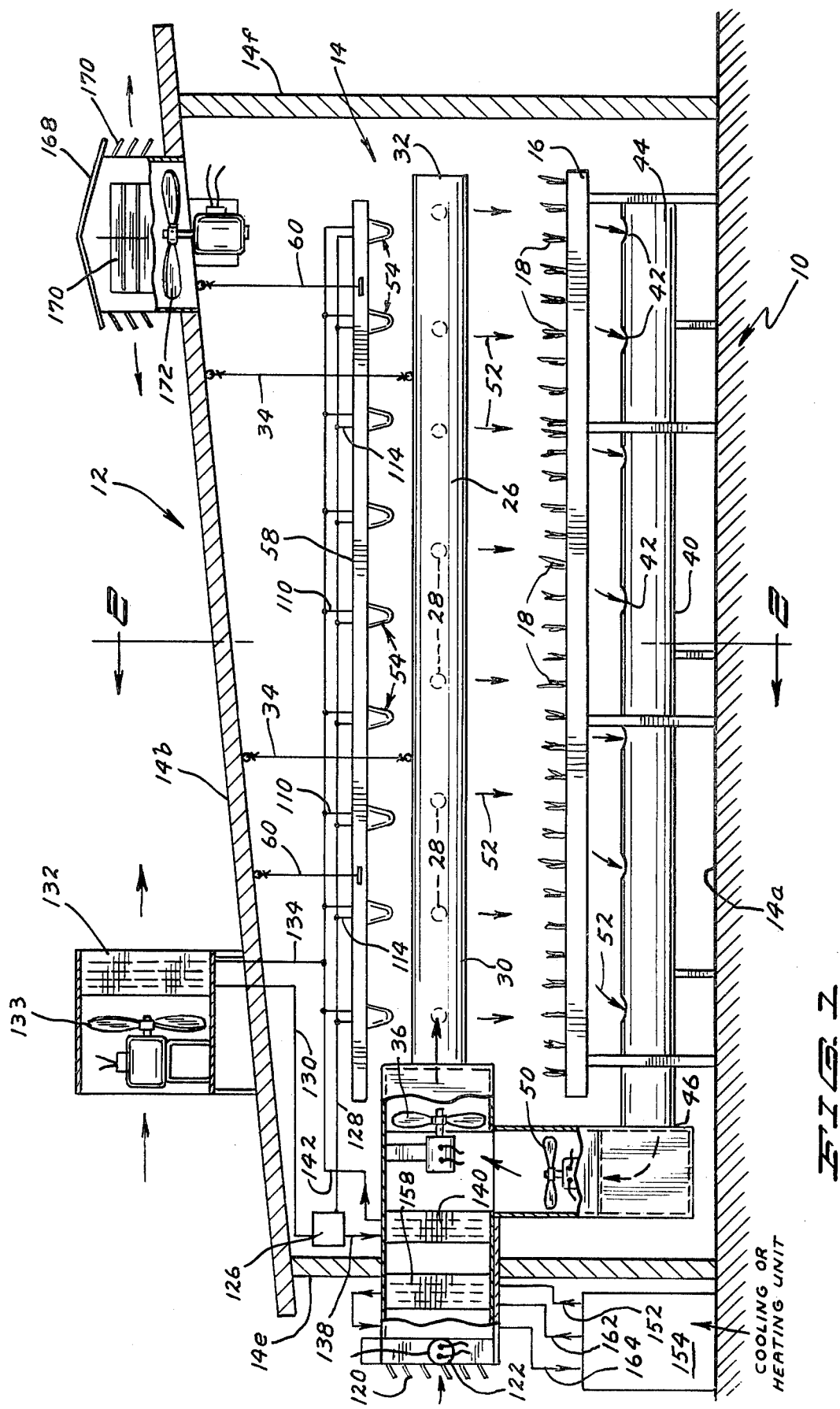
FIG. 1 is a side elevational view of a growth chamber incorporating our invention therein.

Apparatus illustrating our invention has been denoted generally by the reference numeral 10. In this regard, the apparatus 10 includes a building 12 comprising a floor 14a, a roof 14b, side walls indicated by the reference numerals 14c and 14d, and end walls 14e and 14f. The floor 14a, roof 14b, side walls 14c, 14d and end walls 14e, 14f define a growth chamber 14.

Within the growth chamber 14 is a large tray containing a plurality of plants 18. Although when commercially growing the plants 18, the tray 16 would be comprised of a number of small trays which would be advanced from one end of the chamber 14 to the other as the plants mature, such as from a starting point adjacent the end wall 14e in the direction of the end wall 14f, it will simplify the description and the drawings somewhat to consider the tray 16 as a single stationary tray. While the invention is susceptible to use in conjunction with soil-grown plants, it will be assumed that the plants 18 are to be hydroponically grown. Accordingly, the tray 16 is formed in such a manner that it will hold a nutrient-containing fluid medium. Inasmuch as the manner of feeding the plants forms no part of the present invention, any additional description is believed unnecessary; however, that disclosed in U.S. Pat. No. 3,824,736, granted to Noel Davis and entitled "Method and Apparatus for the Factory Production of Plants" can be employed for growing plants when practicing the present invention.

Figure 2:
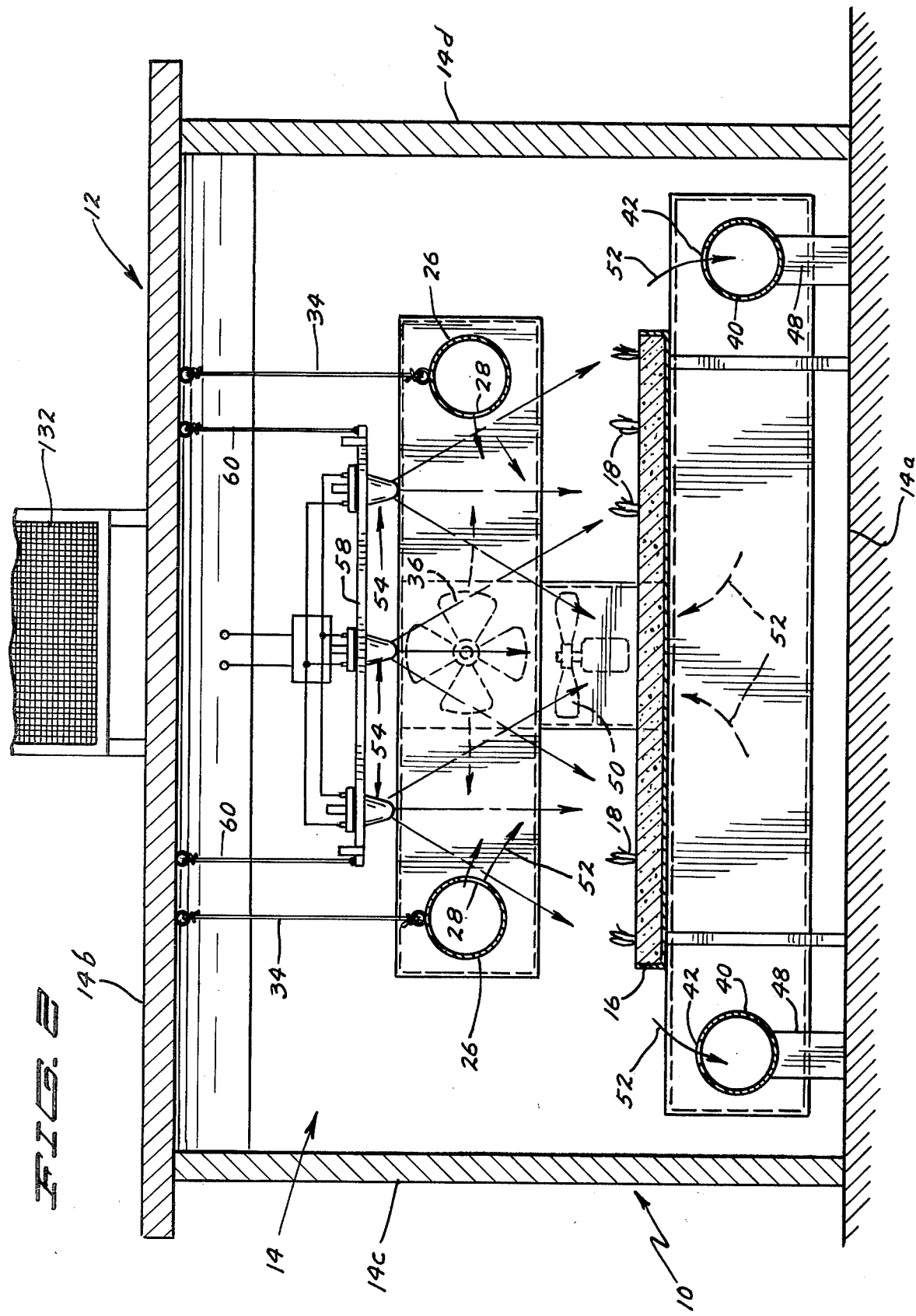
FIG. 2 is a slightly enlarged sectional view in the direction of line 2—2 of FIG. 1.

Appearing in FIGS. 1 and 2 are upper air supply tubes or baffles 26, such as those described in Davis et al U.S. Pat. No. 4,028,847, granted on June 14, 1977 for "Apparatus for Producing Plants." Each tube 26 has a number of outlet openings 28. One end of each tube 26 is open as indicated by the reference numeral 30, this end constituting the inlet end for the particular tube, whereas the opposite end is closed, the closed end being labeled 32. The supply tube or baffles 26 are suspended from the roof 14b through the agency of hangers 34. Adjacent the open inlet 30 of each tube 26 is a motor-driven fan or blower 36.

Whereas the tubes 26 supply air into the growing chamber 14, what will be termed discharge tubes 40 are located beneath the tray 16. The discharge tubes 40 have a plurality of inlet openings 42. Also, each discharge tube 40 has a closed end 44 and an open or outlet end 26. The discharge tubes are mounted on supports 48 extending upwardly from the floor 14a. Adjacent the outlet ends 46 is a motor-driven fan or blower 50.

While the fans or blowers 36 and 50 are intended to circulate air within the growing chamber 14, doing so through the tubes 26 and 40, auxiliary fans or blowers can be strategically disposed within the chamber 14. As the description progresses, it will be appreciated that most of the air utilized in the practicing of the invention is circulated through the confines of the chamber 14, as generally denoted by the various arrows 52, whereas a small portion of percentage thereof is withdrawn and replaced with fresh outside air.

Playing a very important role in the practicing of the invention are a plurality of light units or fixtures 54. Obviously, the total number of light fixtures 54 will depend upon the size of the chamber 14 and also on the wattage of each lamp.

Figure 4:
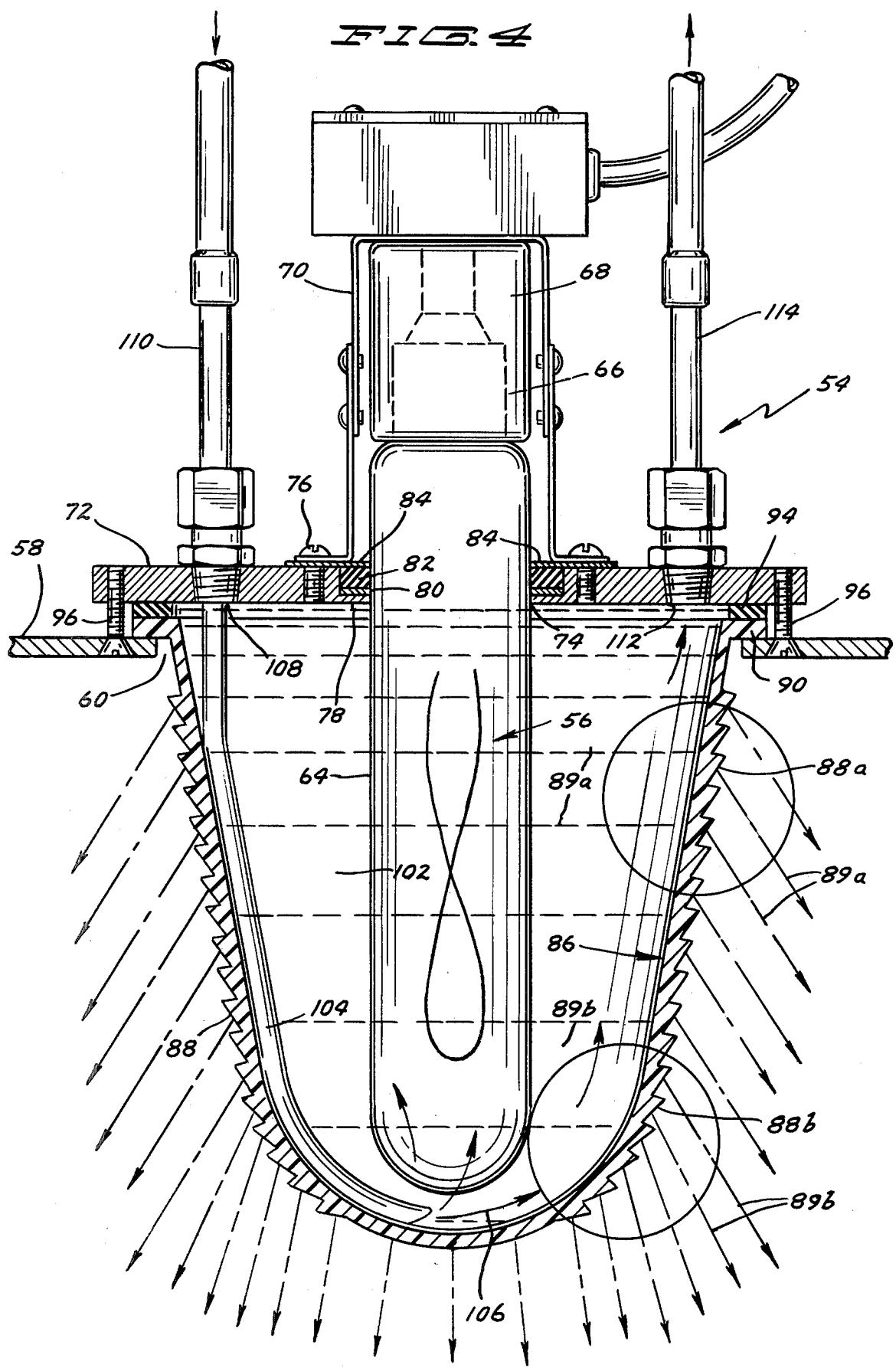
FIG. 4 is an enlarged detail sectional view through one of the light fixtures.

From FIG. 4 it will be discerned that the particular light fixture 54 pictured therein comprises a high intensity discharge lamp 56. While the wattage of the lamp 56 can vary, it is contemplated that it will be on the order of 400–1000 watts. Further, inasmuch as specific portions of the light spectrum are of greater significance in stimulating plant growth, the lamps 56 may vary as to their type. In other words, it is customary in utilizing artificial light to blend the light from different types of lamps for the purpose of obtaining a preferred balance of light wavelengths between 400 and 700 nanometers.

The various light fixtures, which have been denoted generally by the reference numeral 54, are supported on a panel 58, suspended by a plurality of hangers 60 from the roof 14b. Describing one light fixture 54 in detail, it is to be observed that the lamp 56, which can be considered to be a 400 watt high intensity discharge lamp (such as the so-called Mercury, Multi-Vapor and Lucalox types manufactured by the General Electric Company), in each fixture 54 comprises a transparent glass bulb or tube 64 and a base 66, the base being uppermost. The light fixture 54 additionally includes a socket 68 for receiving the base 66 therein. The socket 68 is mounted on a bracket 70 which is supported on an annular support flange 72 having a hole 74 centrally disposed therein. Although not important to an understanding of the invention, it will be perceived that screws 76 extend through out-turned feet on the bracket 70 into the flange 72. It will be noted that the hole 74 is formed with a shoulder at 78 and that a supporting ring 80 rests on the shoulder 78. On the supporting ring 80 is a resilient sealing ring 82. Engaging the periphery of the sealing ring 82 at its upper side is a clamping ring 84, the clamping ring 84 being held in place by the previously mentioned screws 76.

The light fixture 54 further includes an outer envelope in the form of a transparent outer globe 86 having a prismatic surface 88 for the refracting or bending the light rays from the lamp 56 downwardly in addition to the initial refraction, as will be explained hereinafter.

Adjacent the upper peripheral edge of the globe 86 is an annular flange 90, the flange 90 resting on the marginal portion of the panel 58 circumjacent the opening 60 shown in FIG. 4. A gasket 94 is employed and it will be observed that screws 96 extend upwardly through the panel 58 in the illustrative instance into the annular support flange 72 so as to tightly clamp the flange 90 against gasket 94. In this way, the gasket 94 provides a liquid-tight seal for the flange 90.

It is important to recognize that the bulb or tube 64 functions as an inner transparent wall and that the globe 86 functions as an outer transparent wall, the two forming a void or space 102 therebetween. A heat-absorbing liquid, preferably water (although ethylene glycol or other suitable liquid may be used) is caused to flow or circulate through the void or space 102 in order to remove a substantial portion of the heat generated from each lamp 56. To achieve the flow, a tube 104, having a lower discharge end 106 and an upper inlet end 108, is disposed in the space 102 at one side of the bulb 64. An inlet supply pipe 110 is appropriately connected to the upper or inlet end 108 of the tube 104.

Thus, water introduced into the upper end 108 of the tube 104 is discharged through the end 106 at the bottom of the lamp 56. The water rises as it is heated by the lamp 56, encompassing the tube or bulb 64 as the water travels upwardly through the space 102 to an outlet 112 in the annular flange 72. A discharge pipe 114 is connected to the annular flange 72 in a water tight relationship with the outlet 112.

Consequently, the resilient sealing ring 82 acts to prevent the escape of water from the void or space 102 circumjacent the upper portion of the tube or bulb 64. Thus, all of the water introduced through the tube 104 from the supply pipe 110 must exit via the discharge pipe 114 carrying with it a substantial portion of the heat generated by the lamp 56.

Whereas the bulb or tube 64 belonging to the lamp 56 is subjected to high heat, being on the order of 500° F. on its outer surface, the water flowing through the void or space 102 substantially lowers the temperature at the inner surface of the globe 86, being on the order of only 100° F. Irrespective of whether the lamp 56 has a 400 (as previously mentioned) or 1000 watt rating, the actual wattage during operation is reduced because the lamp does not get up to its designed operating temperature. Due to this less light is emitted. However, the invention permits the lamp 56 to be driven at its rated wattage or even five to ten percent higher by employing a special ballast. Because of the improved cooling capability temperature levels that would otherwise accelerate the breakdown of the lamp are not reached and the length of lamp life is not sacrificed.

Whereas the tube or bulb 64, as the case may be, must withstand high heat, it is usually of glass or quartz. On the other hand, owing to the appreciably lower temperature innerjacent the globe 86, the globe can be of acrylic plastic which lends itself readily to being molded with the refractive surface 88 integral therewith. Inasmuch as the refractive surface 88 is instrumental in eliminating the need for external reflectors, as heretofore utilized in conventional growth chambers, attention is now directed to FIGS. 5 and 6.

From these two figures it will be understood that considerable refraction is realized by having the light pass through several media, namely, glass (bulb or tube 64), water (in the space 102) and plastic (globe 86). Even without forming the outside of the globe 86 with prismatic surfaces, considerable refraction of the light coming from the bulb or tube 64 can be realized, for there is a bending of the light leaving the bulb 64 as it traverses the water in the void or space 102 and further bending as it passes from the void or space 102 through the globe 86.

Figure 5:
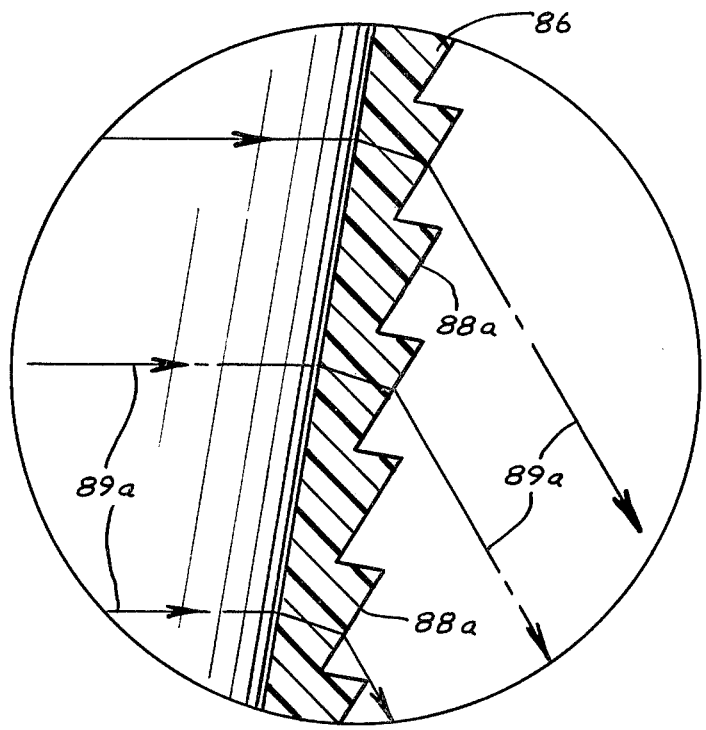
FIG. 5 is an enlarged sectional view taken at an upper encircled portion of FIG. 4 for the purpose of showing the light refraction produced by the inner bulb, intermediate water and outer globe at one location.
Figure 6:
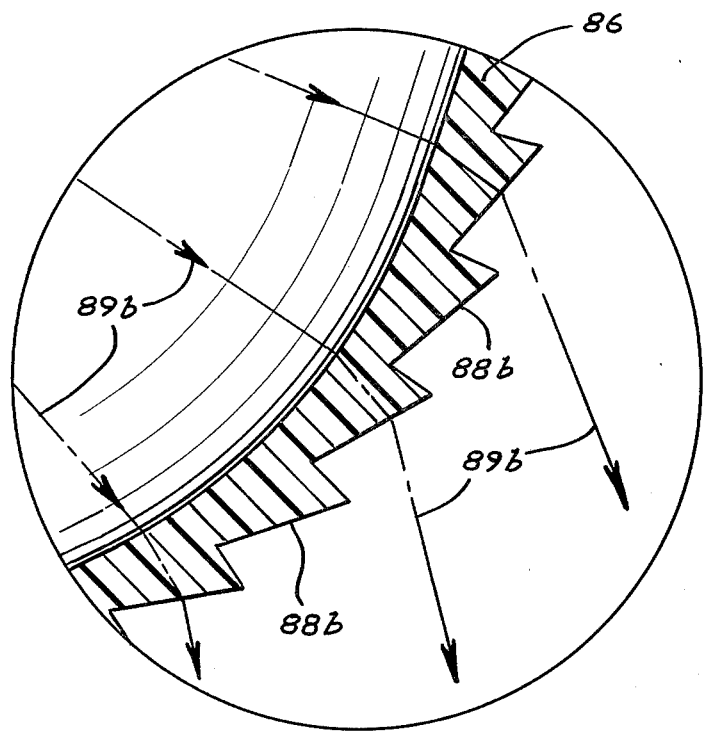
FIG. 6 is a view similar to FIG. 5 but taken at a lower location delineated by a second or lower circle.

However, the encircled prismatic surfaces denoted by the reference numerals 88a and 88b (as well as others not specifically identified), which are enlarged in FIGS. 5 and 6, are effective in bending the light rays even more, assuring that more light will be directed downwardly onto the plants 18 therebelow. For the sake of pictorial completion, light rays 89a and 89b have been superimposed on FIGS. 5 and 6, respectively, to show the bending that is accomplished without resort to external reflectors, as required in the past.

Of course, the invention does not rule out reflectors. They would, if used, prove most beneficial if placed along the walls 14c and 14d. The refractive or prismatic surfaces 88a and 88b (and others) collectively constitute the surface denoted generally by the reference numeral 88 in FIG. 4. In this regard, the refractive surface 88 is in the form of a Fresnel lens. While lenses of this type are generally well known, it is believed unique to employ this type of refractive surface 88 in the growing of plants under artifical lights.

As can best be seen in FIG. 1 (but also visible in the diagram constituting FIG. 3), adjustable louvers 120 are mounted in the end wall 14e. The louvers 120 are operated by a controller 122. As the description progresses, it will be learned that the louvers 120 are pivoted into an adjusted degree of opening in accordance with the humidity of the outside air passing through the louvers 120 into the growth chamber 14. Accordingly, as can be discerned with FIG. 3, a dew point sensor 124 provides appropriate signals to the controller 122 so that the louvers 120 are properly adjusted. The air passing through the louvers 120 is to replace air that has been withdrawn from the growth chamber 14. The incoming air, it should be recognized, is less moist than the air it replaces, thus serving to control the humidity of the air within the chamber 14.

Figure 3:
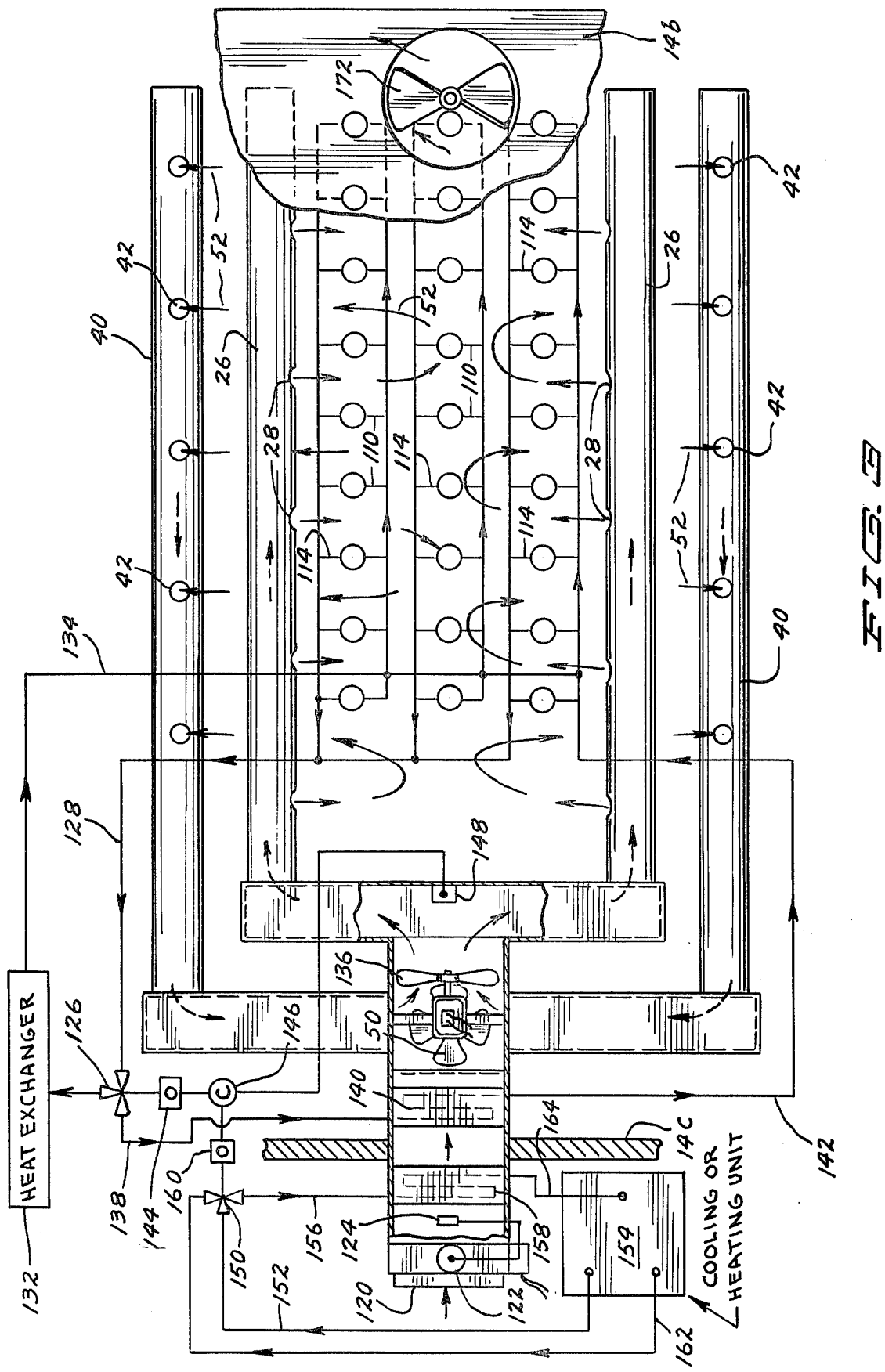
FIG. 3 is a schematic diagram of apparatus exemplifying the invention.

From FIGS. 1 and 3 it can be seen that a 3-way valve 126 has its inlet port connected to the various discharge pipes 114 through the agency of a line 128, there being a discharge pipe 114 for each light fixture 54. Whereas the line 128 leads to the inlet port of the 3-way valve 126, an additional line 130 extends from one of the two discharge ports of the 3-way valve 126 to a first heat exchanger 132 having a motor-driven fan or blower 133 associated therewith. The water after flowing through the heat exchanger 132 can be returned to the various light fixtures 54 through a return line 134. In other words, the line 134 connects with the supply pipes 110 for the various fixtures 54.

Although the heat exchanger 132 can reject the unwanted heat removed from the lamp water to the atmosphere, it is more efficient, it will be appreciated, to transmit this heat to a building (not shown) other than the building 12.

Still another line 138 extends from the second discharge port of the 3-way valve 126, this pipe or line leading to a second heat exchanger 140. As perhaps better understood from FIG. 1, the heat exchanger 140 is just inside the building 12 and heats the replacement air coming in through the louvers 120. As with the heat exchanger 132, the water flowing through the heat exchanger 140 can be returned to the supply pipes 110; therefore, a return line 142 has been presented in FIGS. 1 and 3 which connects with the supply pipes 110.

At this stage, it perhaps should be pointed out that the fresh air from the outside which enters the growth chamber 14 through the louvers 120 should, generally speaking, be at a suitable temperature. It is the function of the heat exchanger 140 to add heat from the circulating water to the incoming outside air. To do this, a valve operator 144 for the valve 126 operates the valve 126 to direct whatever flow of lamp water is needed for heating the incoming air through the heat exchanger 140. A temperature controller 146, receiving temperature-respresentative signals from a temperature sensor 148, effects the foregoing. If all available heat is needed, then the 3-way valve 126 provides fluid communication from its inlet port to the discharge port and then through the line 138 to the exchanger 140. If not all of the heat contained in the lamp water is needed, then the 3-way valve 126 is instrumental in directing the surplus heat through the line 130 to the heat exchanger 132.

Inasmuch as there will be times when the waste heat contained in the lamp water is not adequate for elevating the incoming air to the proper temperature, a second 3-way valve 150 is employed having two inlet ports and one discharge port. One inlet port of the valve 150 is connected via a line 152 to a combined hot water heater and cooling unit 154. A line 156 connects the discharge port of the valve 150 to a further heat exchanger 158 which is adjacent the heat exchanger 140, both exchangers 140 and 158 being in the incoming stream of air entering through the louvers 120. In this way, if the heat derived from the lamp water is inadequate, additional heat can be obtained from an independent source, which in the present case is the heater portion of the unit 154. A valve operator 160 for the valve 150 is commanded to make this adjustment, being connected to the previously mentioned temperature controller 146 which acts in accordance with the temperature sensed by the temperature sensor 148. In other words, if the fresh air temperature remains too low, the sensor 148 recognizes this and calls for more heat which is supplied by the unit 154 in the manner just described.

Conversely, if no heating is required, then the temperature controller 146 acts to divert the lamp water to the heat exchanger 132 so that no lamp water is sent through the heat exchanger 140. At the same time, since no heat is asked for, the separate unit 154 does not supply any heated water to the heat exchanger 158, the valve operator 160 closing the inlet port connected by means of the line 152 to the auxiliary heat source 154.

Assuming now that not only no heat is needed as far as the incoming air is concerned, but that it should actually be cooled. Of course, it should be recognized that the invention substantially reduces the need for any air conditioning. However, to take care of the small demand for cooling that will arise from time to time, depending largely on the geographical location of the chamber 14, the combined heating and air conditioning unit 154 is provided, a cooling line 162 being connected to the second inlet port of the 3-way valve 150. Thus chilled water is circulated through the heat exchanger 158 from the air conditioning or cooling portion of the unit 154 instead of hot water therefrom. A line 164 returns the heating or cooling water, after it has passed through the exchanger 158 to the unit 154.

Inasmuch as the quantities of air and flow rates employed in a commercial growth chamber 14 are susceptible to variation depending upon the size thereof specific figures need not be presented. In a typical installation, growing conditions would require replacement of some air for that which is removed. For the sake of convenient reference, the removed air will simply be referred to as "X" cubic feet per minute. Most of the air, though, would constantly be recirculated through the tubes 26 and 40 within the chamber 14, and this will be referred to as "Y" cubic feet per minute. When "X" cubic feet per minute are being withdrawn, "X" cubic feet would be introduced through the louvers 120 to replace the "X" amount removed.

More specifically, the "X" cubic feet per minute of fresh air supplied through the louvers 120, whether heated or cooled, will contain appreciably less moisture than the "X" amount of air withdrawn from the growing chamber 14. Hence, the "X" amount of new air functions to dehumidify the "Y" amount of air being circulated within the chamber 14 by simply adding "X" amount of replacement air of a lower humidity than that taken out.

To remove the "X" amount of air from the chamber 14, a ventilator 168 is installed in the roof 14b having louvers 170 (FIG. 1). By means of a motor-driven fan or blower 172, the ventilator 168 expels the air into the atmosphere at a location remote from the louvers 120. Although such a building is not illustrated, it will usually be more practical and efficient to use the air that is withdrawn for heating a nearby building.

At any rate, the "X" cubic feet per minute of air that is being removed from the growth chamber 14 via the ventilator 168 is constantly being replaced at an equal rate with "X" amount of air coming in through the louvers 120. The "Y" cubic feet per minute air that is being recirculated in the chamber 14 itself is not treated at all. It is only the "X" cubic feet per minute that requires either heating or cooling through the agency of the heat exchangers 140 and/or 158, as the case may be. Thus, for a growing chamber that in the past has required an air conditioning unit of a given size, when practicing the teachings of the instant invention an air conditioning unit having a rating less than half of that previously employed can be employed.

The above reduction in air conditioning load is made possible by removing the heat generated by the light fixtures 54 before it is radiated into the air in the growing chamber 14, this being done without adversely affecting the amount of light being radiated into the growth chamber onto the plants 18. In the past, the light fixtures have radiated a substantial amount of heat into the air within the particular growth chamber, necessitating a large amount of air conditioning or cooling. It was the air itself that had to be cooled in order to reduce the temperature. Not only does the previous type of system require considerable energy for its operation, increasing the initial capital investment and, even more importantly, increasing the operating costs as well, but the increased amount of air conditioning dehumidifies or dries out the air within the growing chamber to such an extent that it adversely affects the way in which the plants grow.

Owing to the fact that the humidity within the chamber 14 can be quite accurately controlled with the method and apparatus herein described, it follows that whatever air temperature within the chamber 14 that is best for the particular plants 18 can be realized. Consequently, not only is the morphology or shape of the plants 18 greatly improved but the growth rate is increased or, in other words, the length of time for the plants to mature is reduced. Less costly light fixtures can be used. More light is obtained. Added to these advantages is the appreciable reduction in the amount of power required, stemming especially from the lower air conditioning load. Furthermore, the described method and apparatus lends itself readily to supplying heat to other buildings, thereby further contributing to the conserving of energy.

We claim:

1. Apparatus for promoting plant growth comprising a growth chamber containing plants to be cultivated, at least one light fixture including a lamp for directing light onto said plants, said lamp including a bulb through which said light is directed, said bulb being oriented about a substantially vertical axis, said fixture further including a single outer globe through which light from the lamp is also directed, said globe being generally uniformly spaced from said bulb and mounted generally concentrically about said vertical axis, an inlet pipe connected to said fixture for introducing a liquid into the substantially uniform space between said bulb and globe at a first location near said bulb so that said liquid is in direct contact with said bulb to remove a substantial amount of the unwanted radiation produced in the generation of said light after said substantial amount of unwanted radiation has passed through said bulb so that said unwanted radiation does not pass through said globe into said growth chamber, and a discharge pipe connected to said fixture for removing said liquid and said unwanted radiation from between said same bulb and globe at a second location also near said bulb which said second location is spaced from said first location.

2. Apparatus in accordance with claim 1 in which said liquid also removes heat produced in the generation of said light.

3. Apparatus in accordance with claim 2 in which said liquid is water.

4. Apparatus in accordance with claim 3 in which said lamp has a neck and base, said base being uppermost, and sealing means extending between said neck and globe.

5. Apparatus in accordance with claim 1 including additional light fixtures mounted in said growth chamber in a spaced relation with said first light fixture and in a spaced relation with each other, each additional light fixture comprising a lamp for directing light onto other plants in said growth chamber, each additional lamp including a bulb through which light is directed, each of said additional bulbs also being oriented about substantially vertical axes, each additional fixture further including a single outer globe through which light from its lamp is also directed, each globe of said additional fixtures being generally uniformly spaced from the bulb of the fixture with which it is associated and mounted generally concentrically about the vertical axis about which its associated bulb is oriented, an inlet pipe connected to each of said additional fixtures for introducing a liquid into the substantially uniform space between the bulb for that fixture and the globe associated therewith at a first location near the bulb for that particular fixture in order that the liquid is in direct contact with its particular bulb to remove a substantial amount of the unwanted radiation produced in the generation of light after said substantial amount of unwanted radiation has passed through the particular bulb of a given fixture so that said unwanted radiation does not pass through the globe associated with that particular fixture into said growth chamber, and a discharge pipe connected to each of said additional fixtures for removing the liquid introduced into the fixture with which it is associated along with the unwanted radiation from between the bulb and globe associated with that particular fixture, said discharge pipe in each instance being located at a second location near the bulb with which it is associated but with the discharge pipe in each instance being located at a second location spaced from the first location for that particular fixture, and means for supplying liquid at substantially the same temperature to each of said inlet pipes so that substantially the same amount of unwanted radiation is removed from each fixture.

6. Apparatus for promoting plant growth comprising a growth chamber containing plants to be cultivated, at least one light fixture including a lamp for directing light onto said plants, said lamp including a vertically oriented bulb through which said light is directed, said lamp having a neck and base with said base being uppermost, said fixture further including a single outer globe through which light from the lamp is also directed, said globe being spaced from said bulb, sealing means extending between said neck and globe, a tube extending downwardly through said sealing means to introduce said liquid into said space at a location beneath said lamp, means for causing water to flow between said bulb and globe in direct contact with said bulb to remove unwanted heat produced in the generation of said light after said substantial amount of unwanted radiation has passed through said bulb so that said unwanted radiation does not pass through said globe into said growth chamber.

7. Apparatus for promoting plant growth comprising a growth chamber containing plants to be cultivated, a plurality of light fixtures for directing light onto said plants, each of said fixtures including inner and outer light transmissive walls through which said light is directed, means for causing a liquid to flow between said walls to remove a substantial amount of the unwanted radiation produced in the generation of said light, means for circulating air within said chamber, means for withdrawing some of the air from said growth chamber, first heat exchanger means for heating said fresh air as it enters said chamber, means for directing at least a portion of said liquid after it has passed between the inner and outer light transmissive walls of said light fixtures to said first heat exchanger means, means for sensing the air temperature within said growth chamber, means for controlling said first heat exchanger means in accordance with the temperature sensed by said sensing means to increase the temperature of said fresh air as it is introduced into said chamber, and second heat exchanger means outside of said chamber connected to said heat directing means so that liquid from said light fixtures can be directed to said second heat exchanger means when not needed by said first heat exchanger means.

8. Apparatus in accordance with claim 7 including third heat exchanger means for heating said fresh air as it enters said chamber, and an auxiliary means for supplying a heated medium to said third heat exchanger means when said lamp liquid is unable to heat said entering air to a desired temperature.

9. Apparatus in accordance with claim 8 including auxiliary cooling means for supplying a medium to said third heat exchanger means when said entering air is below said desired temperature.

10. Apparatus in accordance with claim 9 including means for adjusting the rate at which said fresh air enters said chamber.

11. Apparatus in accordance with claim 10 including means for sensing the dew point of said entering air, and means for controlling said adjusting means in accordance with the dew point sensed by said last-mentioned sensing means.

12. A method for promoting plant growth within a growth chamber comprising the steps of subjecting plants within said chamber to artificial light from a plurality of light fixtures, each light fixture having an inner and outer generally transparent wall, passing a radiation-absorbing liquid between said inner and outer walls at a sufficient flow rate to remove unwanted radiation from said light as said light is transmitted through said walls and liquid so as to prevent said unwanted radiation from being transmitted into said growth chamber, recirculating a substantial amount of air within said growth chamber, introducing a relatively small amount of fresh air into said chamber at a rate to control the humidity of the air being recirculated within said growth chamber, removing a portion of the air within said growth chamber in an amount and at a rate corresponding to the amount and rate at which said fresh air is introduced into said growth chamber, and maintaining a desired temperature of the air within said growth chamber by heating said fresh air being introduced into said growth chamber with at least some of said radiation-absorbing liquid after said liquid has passed between said inner and outer walls when said air being recirculated within said growth chamber is below a desired temperature.

13. Apparatus in accordance with claim 12 in which said globe is formed with a prismatic surface for refracting the light from said lamp downwardly onto said plants.

14. Apparatus for promoting plant growth comprising a growth chamber containing plants to be cultivated, a plurality of light fixtures for directing light onto said plants, each of said fixtures including a single inner and a single outer light transmissive wall through which said light is directed, said inner and outer walls being oriented about a substantially vertical axis, means for causing a liquid to flow between said walls to remove a substantial amount of the unwanted radiation produced in the generation of said light, means for recirculating air within said chamber, means for introducing fresh air into said chamber, means for adjusting the rate of fresh air introduced into said chamber to control the humidity of the air being recirculated within said growth chamber, means for removing air from said growth chamber at the rate that air is introduced into said growth chamber, and means for controlling the temperature of the air being introduced into said growth chamber to maintain a desired temperature of the air being recirculated within said growth chamber.

15. Apparatus in accordance with claim 14 in which said temperature controlling means includes a heat exchanger in the path of said fresh air as it enters said chamber.

16. Apparatus in accordance with claim 15 including means for directing at least a portion of said liquid after it has passed between the inner and outer light transmissive walls of said light fixtures to said heat exchanger when the temperature of the air being recirculated within said growth chamber is below said desired temperature.

17. Apparatus in accordance with claim 15 including means for directing a cooling medium to said heat exchanger when the temperature of the air being recirculated within said growth chamber is above said desired temperature.

* * * * *